United States Patent
Collins et al.

(10) Patent No.: US 11,301,892 B1
(45) Date of Patent: Apr. 12, 2022

(54) SYSTEMS AND METHODS FOR FACILITATING TRANSACTIONS WITH REWARDS

(71) Applicant: Wells Fargo Bank, N.A., San Francisco, CA (US)

(72) Inventors: Megan Collins, Westfield, NJ (US); Minhthe Luu, Mount Laurel, NJ (US); Annette S. Marsh, Cincinnati, OH (US); Karen D. Tom, San Francisco, CA (US); Cheryl Lynn Wu, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 223 days.

(21) Appl. No.: 15/189,360

(22) Filed: Jun. 22, 2016

(51) Int. Cl.
| | |
|---|---|
| *G06Q 30/00* | (2012.01) |
| *G06Q 30/02* | (2012.01) |
| *G06Q 20/38* | (2012.01) |
| *G06Q 20/40* | (2012.01) |
| *G06Q 20/36* | (2012.01) |

(52) U.S. Cl.
CPC ......... *G06Q 30/0233* (2013.01); *G06Q 20/36* (2013.01); *G06Q 20/381* (2013.01); *G06Q 20/407* (2013.01)

(58) Field of Classification Search
CPC ..... G06Q 30/0207–0277; G06Q 20/36; G06Q 20/407; G06Q 20/0381
See application file for complete search history.

(56) References Cited

U.S. PATENT DOCUMENTS

| | | | |
|---|---|---|---|
| 2001/0054003 A1* | 12/2001 | Chien ................... | G06Q 20/04 705/14.17 |
| 2003/0191711 A1* | 10/2003 | Jamison ................ | G06Q 20/04 705/40 |
| 2009/0018924 A1* | 1/2009 | Roberts ................. | G06Q 20/32 705/21 |
| 2013/0159087 A1* | 6/2013 | Boyd .................... | G06Q 30/06 705/14.33 |
| 2015/0058132 A1* | 2/2015 | Tuck ..................... | G06Q 30/02 705/14.66 |

(Continued)

OTHER PUBLICATIONS

Emvco, LLC, EMV® Payment Tokenisation Specification—Technical Framework, Version 1.0, Mar. 2014, 84 pages.

(Continued)

*Primary Examiner* — Kambiz Abdi
*Assistant Examiner* — Christopher Stroud
(74) *Attorney, Agent, or Firm* — Foley & Lardner LLP

(57) ABSTRACT

Systems, methods, and apparatuses for performing a pay with points rewards transaction are described herein. A customer of a financial institution having a rewards account associated with a payment account can provide parameters for future transactions that are to be paid with points instead of charged to the payment account. To designate the future transaction as a rewards transaction, the customer sets rewards transaction parameters (e.g., via a mobile banking application, via an online banking portal, via a telephone system associated with the financial institution, etc.). After setting the rewards transaction parameters, the financial institution identifies a purchase request that matches the rewards transaction parameters and processes the transaction as a rewards transaction.

18 Claims, 8 Drawing Sheets

(56) References Cited

U.S. PATENT DOCUMENTS

2015/0120418 A1\* 4/2015 Cervenka ........... G06Q 30/0222
 705/14.23
2015/0149271 A1\* 5/2015 Battle ................ G06Q 30/0233
 705/14.33
2017/0278093 A1\* 9/2017 Emoff ................ G06Q 20/3224

OTHER PUBLICATIONS

U.S. Bank National Association, Real-Time Rewards, U.S. Bank FlexPerks, available at least as early as Dec. 5, 2015, retrieved from the Internet at http://www.flexperks.com/credit/offer.do?redirect=rtr&lang=en on Oct. 4, 2016, 2 pages as printed.

\* cited by examiner

300

SYSTEMS AND METHODS FOR FACILITATING TRANSACTIONS WITH REWARDS

TECHNICAL FIELD

Embodiments of the present disclosure relate to systems and methods for redeeming rewards.

BACKGROUND

Many issuers of credit cards offer rewards points to customers. For example, some credit card issuers provide one reward point for every dollar spent on the credit card. Accordingly, as a customer continues to use a rewards credit card, the customer accumulates rewards points. The customer can then redeem the rewards points. Some credit cards restrict how the accumulated rewards points can be redeemed. For example, some rewards points can only be used for a statement credit or as cash back, while other rewards points can only be used to purchase goods and services from a rewards catalog.

SUMMARY

A first example embodiment relates to a method of performing a rewards transaction. The method includes receiving, by a financial institution computing system associated with a financial institution, pay with points parameters that define a rewards transaction associated with a payment account maintained by the financial institution and associated with the customer. The method further includes receiving, by the financial institution computing system, a payment request associated with the payment account, the payment request includes a cost in a currency. The method includes determining, by the financial institution computing system, that the payment request matches the rewards transaction defined by the pay with points parameters. The method further includes debiting, by the financial institution computing system, an amount of points from a rewards account maintained by the financial institution and associated with the customer.

Another example embodiment relates to a financial institution computing system associated with a financial institution. The system includes a network interface structured to facilitate data communication via a network. The system further includes an accounts database structured to store information associated with accounts held by the financial institution, including a payment account associated with a customer and a rewards account associated with the customer. The system includes a processing circuit comprising a processor and memory. The processing circuit is structured to receive pay with points parameters that define a rewards transaction associated with the payment account associated with the customer. The processing circuit is further structured to receive a payment request associated with the payment account, the payment request includes a cost in a currency. The processing circuit is structured to determine that the payment request matches the rewards transaction defined by the pay with points parameters. The processing circuit is further structured to debit an amount of points from the rewards account associated with the customer.

These and other features, together with the organization and manner of operation thereof, will become apparent from the following detailed description when taken in conjunction with the accompanying drawings.

DETAILED DESCRIPTION

Referring to the figures generally, systems, methods, and apparatuses for performing a pay with points rewards transaction are described herein. A customer of a financial institution having a rewards account associated with a payment account can provide parameters for future transactions that are to be paid with points instead of charged to the payment account in currency. To designate the future transaction as a rewards transaction, the customer sets rewards transaction parameters (e.g., via a mobile banking application, via an online banking portal, via a telephone system associated with the financial institution, etc.). After setting the rewards transaction parameters, the financial institution identifies a purchase request that matches the rewards transaction parameters and processes the transaction as a rewards transaction.

As used herein, "points" refers to rewards issued by a financial institution to a customer that can be redeemed through the financial institution and/or exchanged into currency by the financial institution at an exchange rate that is defined by the financial institution. "Currency" refers to fiat currency (e.g., U.S. Dollars, Euros, etc.) or other forms of generally accepted money (e.g., math-based currencies, crypto currencies, etc.) that are not issued by the financial institution and that can be used by the customer directly with a merchant to purchase goods and/or services.

Figure 1:
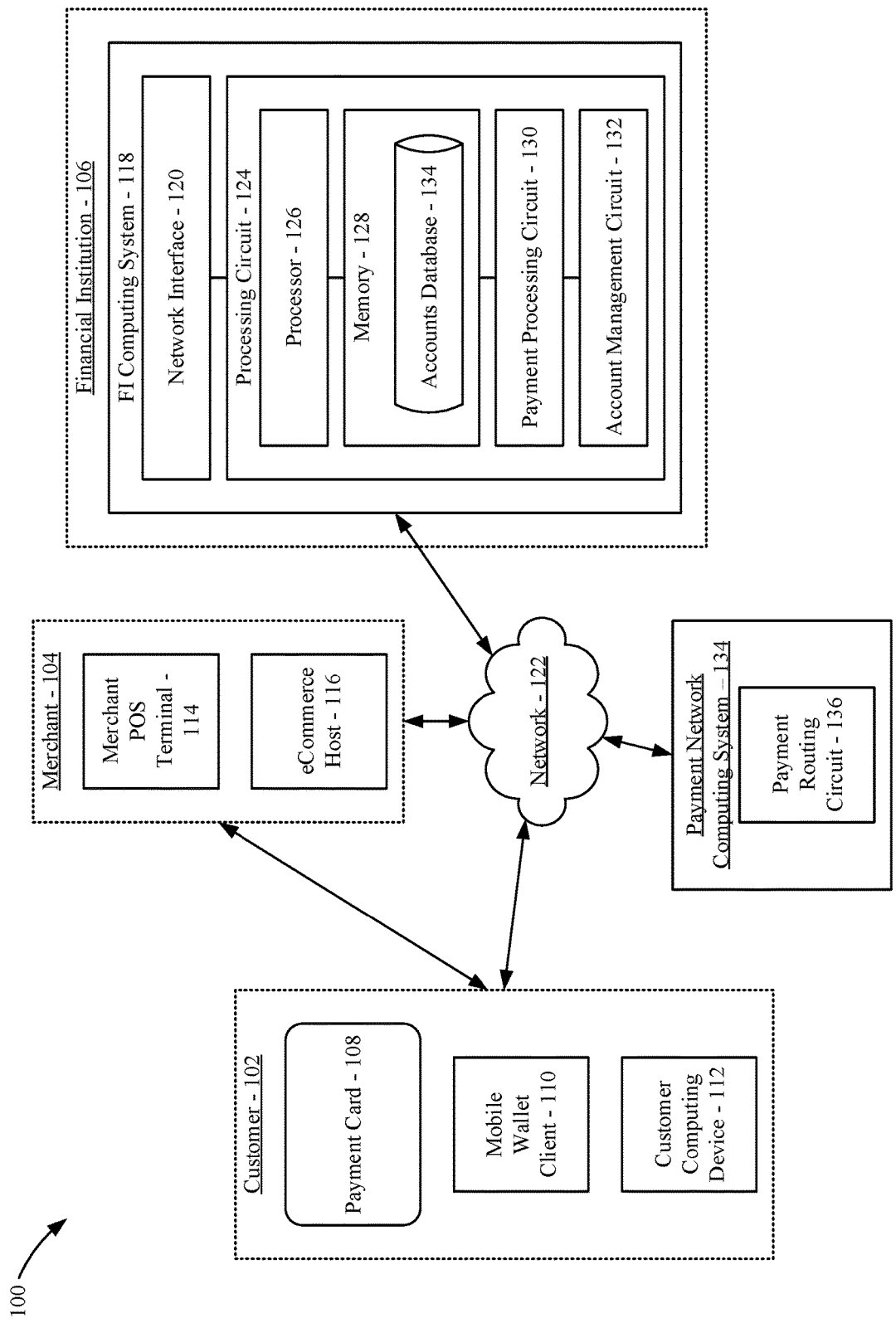
FIG. 1 is a view of a pay with points system according to an example embodiment.

Referring to FIG. 1, a view of a pay with points system 100 is shown according to an example embodiment. Generally, the system 100 facilitates a purchase by a customer 102 from a merchant 104 with points from a rewards account associated with the customer and maintained by a financial institution 106. In some arrangements, the rewards account is associated with a payment account (e.g., a credit account, a line of credit, a demand deposit account, a prepaid account, etc.) maintained by the financial institution 106. In such arrangements, the customer 102 may accrue points in the rewards account by paying for purchases from the payment account. For example, the payment account may be a credit account in which the customer 102 earns a certain number of points for every dollar spent with the credit account (e.g., one point for one dollar, two points for one dollar, a certain percentage of the amount of purchases made, etc.). Through the system, the customer 102 can pay for purchases with the payment account through any number of channels, including a payment card 108, a mobile wallet client 110 running on a mobile device (e.g., a smartphone) associated with the customer 102, or by providing payment account information to the merchant 104 (e.g., via the payment card 108, via a customer computing device 112, by providing payment account information to a representative in person or over the phone, by entering payment account information into a website, etc.).

The payment card 108 is a physical card, such as a credit card, a debit card, a prepaid card, or the like. Accordingly, the payment card 108 can provide account information associated with the payment account (e.g., account number, expiration date, etc.) to a merchant point of sale ("POS") terminal 114 during a transaction between the merchant 104 and the customer 102. The account information may be transmitted, for example, through an encoded magnetic stripe, an embedded smart chip (e.g., an EMV chip), through an embedded near-field communication ("NFC") tag, or the like. For example, the customer 102 can swipe, insert, or tap the payment card 108 at the merchant POS terminal 114 during an in-person transaction at a location of the merchant 104.

The mobile wallet client 110 is an application executed by a mobile device (e.g., a smartphone) associated with the customer 102. The mobile wallet client 110 is structured to provide payment account information to the merchant POS terminal 114 (e.g., by presenting a payment code on a display of the mobile device, by transmitting payment account information via a Bluetooth or NFC transmission, etc.). The mobile wallet client 110 may store and/or transmit the payment account information in accordance with the EMV® Payment Tokenisation Specification—Technical Framework," EMVCo, LLC (Version 1.0, 2014), which is herein incorporated by reference in its entirety and for all purposes. In some arrangements, the mobile wallet client 110 may be any of Apple® Pay, Android® Pay, Samsung® Pay, Wells Fargo® Wallet, or the like.

The customer 102 can also provide the payment account information to an eCommerce host 116 associated with the merchant 104 during an online transaction. For example, the customer 102 can access the online shopping website associated with the merchant 104 via the customer computing device 112 and provide payment account information through a checkout feature of the online shopping web site. In some arrangements, the payment account information corresponds to an account number and expiration date printed or displayed on the payment card 108. The payment account information may, for example, be input into the customer computing device 112 by the customer 102 by typing the payment card information in or by transmitting the payment account information from the payment card 108 to the customer computing device 112. In an alternate arrangement, the payment account information can be provided via transmission from the mobile wallet client 110 to the eCommerce host 116. In a further arrangement, the payment account information can be provided over the phone to a representative of the merchant 104 and associated with a transaction facilitated with the eCommerce host 116.

Still referring to FIG. 1, the payment account is maintained by the financial institution 106. The financial institution 106 may be, for example, a credit card issuer, a bank, or the like. The financial institution 106 includes a financial institution computing system 118. The financial institution computing system 118 includes a network interface 120. The network interface 120 is used to establish connections with other computing systems by way of a network 122. The network 122 may include any combination of the internet, a private banking network, and the like. The network interface 120 includes program logic that facilitates connection of the financial institution computing system 118 to the network 122. For example, the network interface 120 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface 120 includes the hardware and machine-readable media sufficient to support communication over multiple channels of data communication. Further, in some arrangements, the network interface 120 includes cryptography capabilities to establish a secure or relatively secure communication session in which data communicated over the session is encrypted.

The financial institution computing system 118 includes a processing circuit 124 having a processor 126 and memory 128. The processor 126 may be implemented as a general-purpose processor, an application specific integrated circuit (ASIC), one or more field programmable gate arrays (FPGAs), a digital signal processor (DSP), a group of processing components, or other suitable electronic processing components. The memory 128 includes one or more memory devices (e.g., RAM, NVRAM, ROM, Flash Memory, hard disk storage, etc.) that store data and/or computer code for facilitating the various processes described herein. Moreover, the memory 128 may be or include tangible, non-transient volatile memory or non-volatile memory.

The financial institution computing system 118 includes a payment processing circuit 130 and an account management circuit 132. Although FIG. 1 shows the payment processing circuit 130 and the account management circuit 132 as part of the processing circuit 124, in other arrangements one of or both of the payment processing circuit 130 and/or the account management circuit 132 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting. The payment processing circuit 130 is structured to process payment requests associated with payment accounts of customers of the financial institution 106. The payment requests may be received directly from the customer 102 (e.g., via the mobile wallet client 110), from the merchant 104 (e.g., via the merchant POS terminal 114, the eCommerce host 116, etc.), or from a payment network associated with a payment account (e.g., from the payment network computing system 134). The processing circuit 130 processes the payment requests by approving or declining payment requests. For approved payment requests, the processing circuit 130 is structured to charge customers associated with the approved payment requests by debiting a rewards account, a credit account, or the like based on the type of the payment request and the parameters of the payment request. The account management circuit 132 is structured to perform various account management functions, including maintaining an accounts database 134, updating account balances, applying interest to accounts, processing payments related to accounts, and the like.

The financial institution computing system 118 includes the accounts database 134. In some arrangements, the memory 128 includes the accounts database 134. In other arrangements, the accounts database 134 is a separate data storage device from the memory 128. The accounts database 134 is configured to hold, store, categorize, and otherwise serve as a repository for information associated with accounts (e.g., loan accounts, savings accounts, checking accounts, credit accounts, etc.) held by the financial institution 106. For example, the accounts database 134 may store account numbers, account balances, account ownership information, and the like. The accounts database 134 is structured to selectively provide access to information relating to an account at the financial institution 106.

Still referring to FIG. 1, in some arrangements, the payment account is associated with a payment network (e.g., Visa, MasterCard, American Express, Discover, etc.). Accordingly, when the payment account information is received by the merchant 104 during a transaction with the customer 102, the payment account information and the transaction information (e.g., price, merchant information, etc.), may be transmitted to a payment network computing system 134 associated with the payment account. At the payment network computing system 134, a payment routing circuit 136 routes the transaction information and payment account information to the financial institution computing system 118 for further processing (e.g., as described above). In some arrangements, the payment routing circuit 136 is structured to detokenize a tokenized payment account number received from the merchant 102 (e.g., if the customer 102 is paying for the transaction via the mobile wallet client 110). In other arrangements, the tokenized payment account number is detokenized by the payment processing circuit 130 of the financial institution computing system 118.

As described in further detail below with respect to FIGS. 2 through 7, the system 100 allows the customer 102 to designate a future transaction (e.g., a future purchase with the merchant 104) or future transactions as being rewards transactions. The customer 102 can designate the transaction in any number of ways (e.g., via the mobile wallet client 110, via a remote or mobile banking website accessed via the customer computing device 112, via an ATM associated with the financial institution 106, by providing the designation to a representative of the financial institution 106 over the phone or at a branch location, etc.). A rewards transaction is a transaction between the customer 102 and the merchant 104 in which the merchant 104 is paid in currency (as done in a traditional transaction), but the customer 102 spends at least one point from the customer's rewards account instead of paying for the entire transaction with currency (e.g., from the customer's line of credit, from the customer's checking account, etc.). During the rewards transaction, the rewards account associated with the customer 102 is debited a number of points that correlates to the amount of points being spent by the customer 102 for the goods and/or services being purchased from the merchant 104 (e.g., based on an exchange rate of converting points into currency that is set by the financial institution 106). In some arrangements, the customer's payment account is still debited in the same manner as done during a traditional, currency-only transaction, and the financial institution computing system 118 provides a credit to the payment account (e.g., a statement credit, a balance credit, etc.) to offset at least a portion of the transaction cost. The merchant 104 is paid in currency by the financial institution 106 as in a traditional transaction.

Figure 2:
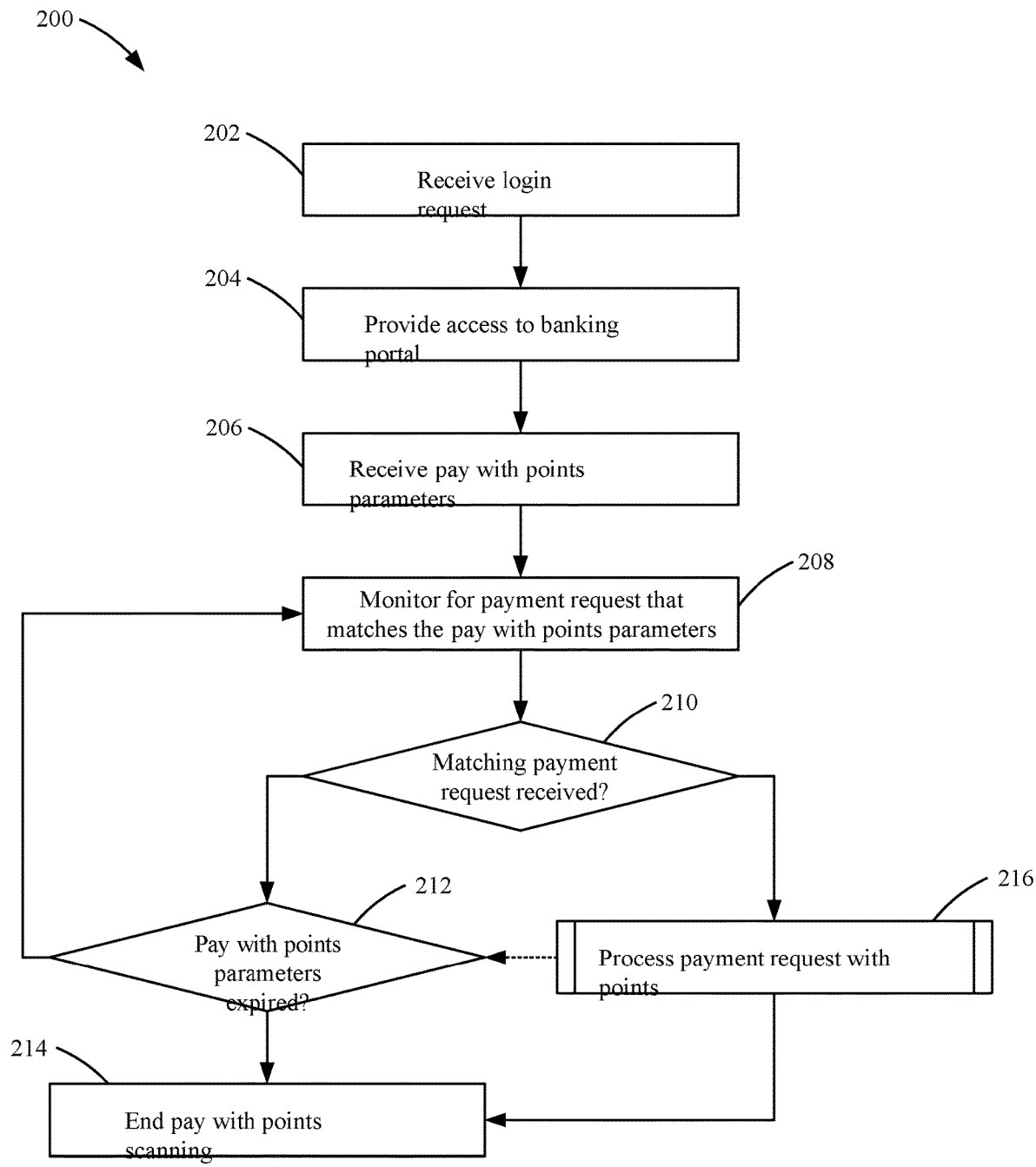
FIG. 2 is a view of a flow diagram of a method of processing a rewards transaction according to an example embodiment.

Referring to FIG. 2, a flow diagram of a method 200 of processing a rewards transaction is shown according to an example embodiment. The method 200 is performed by the financial institution computing system 118. Through the method 200, the financial institution computing system 118 allows customers (e.g., the customer 102) to provide rewards transaction parameters to designate future transactions as being rewards transactions instead of currency transactions. The financial institution computing system 118 then matches transactions entered into by customers to the rewards transaction parameters to identify transactions that are paid for by the customer in points instead of currency.

The method 200 begins when a login request is received at 202. The login request is received at the financial institution computing system 118 from the customer 102. The login request may be received from the customer computing device 112 (e.g., through an online banking website), a smartphone associated with the customer 102 (e.g., through a mobile banking application), through an automated telephone system, an ATM, or the like. The login request relates to an attempt by the customer 102 to access a banking portal associated with the customer's accounts with the financial institution 106. In some arrangements, the login request includes authentication information associated with the customer 102 (e.g., username, password, biometric information, device identifier, etc.). The financial institution computing system 118 compares the received authentication information against verified authentication information associated with the customer 102 to authenticate the customer 102. If the customer 102 is authenticated, access to a banking portal is provided at 204. The banking portal allows the customer to configure parameters to designate a future transaction made via the payment account as being a rewards transaction instead of a currency transaction.

Pay with points parameters are received at 206. The financial institution computing system 118 receives the pay with points parameters that define a future transaction as a rewards transaction from the customer 102 via the banking portal. In some arrangements, the customer 102 transmits the pay with points parameters via the customer computing device 112 or the mobile wallet client 110. In other arrangements, the customer 102 provides the pay with points parameters to a person representative (e.g., call center representative, branch employee, etc.) or a computing device associated with the financial institution 106 (e.g., a kiosk, an ATM, etc.) that provides the parameters to the financial institution computing 118.

Figure 3:
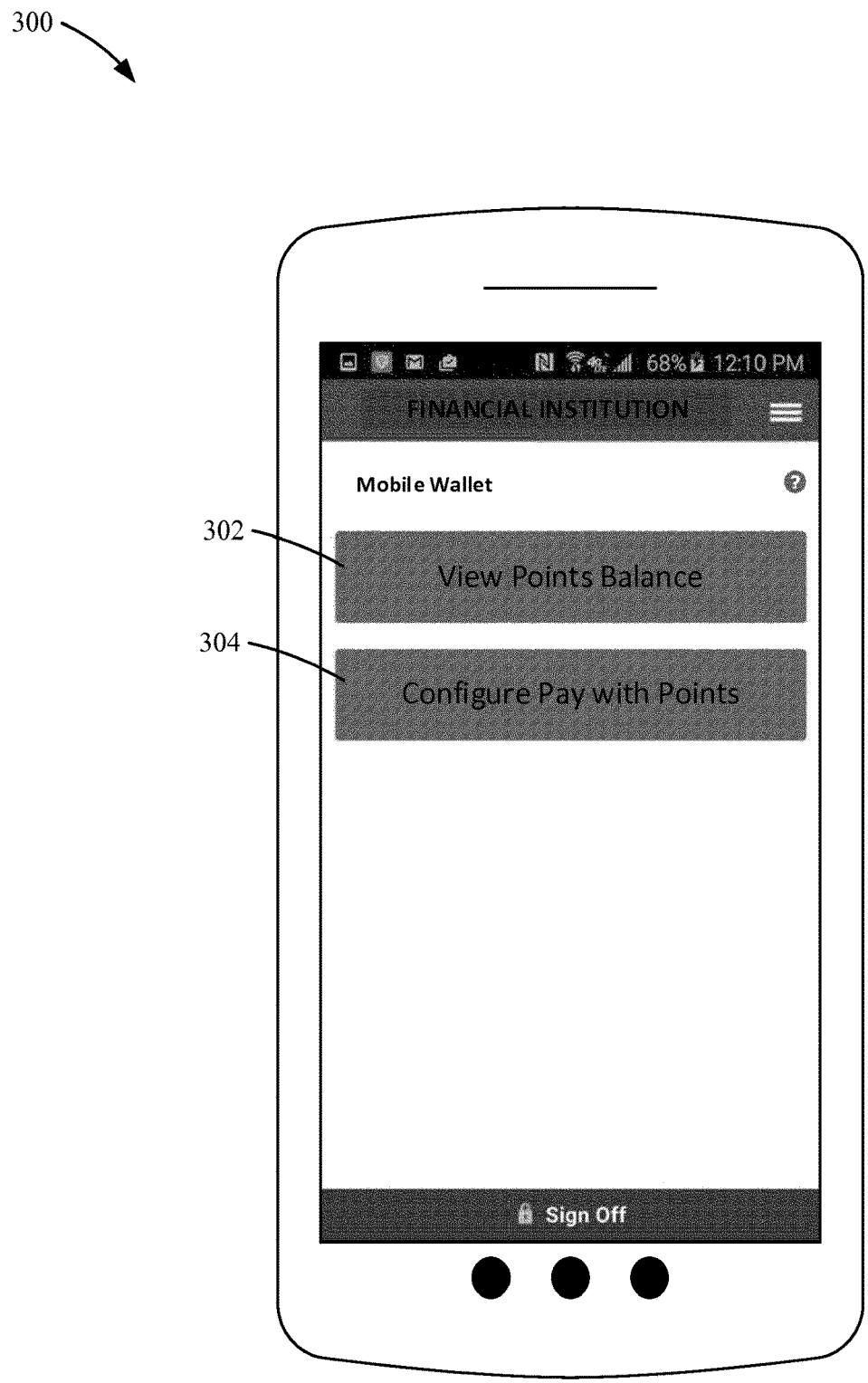
FIGS. 3 through 6 show various user interfaces of a customer device during configuration of the rewards transaction as described in the method of FIG. 2.
Figure 4:

For example, as shown in FIG. 3, the customer 102 can log into the mobile wallet client 110 or a mobile banking website portal via the customer's smartphone 300 to access the banking portal. Through the banking portal, the customer 102 can select from a number of options relating to the customer's rewards account. If the customer 102 selects the "View Points Balance" button 302, the user interface of the banking portal updates to display the customer's rewards points balance at 402 (as shown in FIG. 4).

Figure 5:
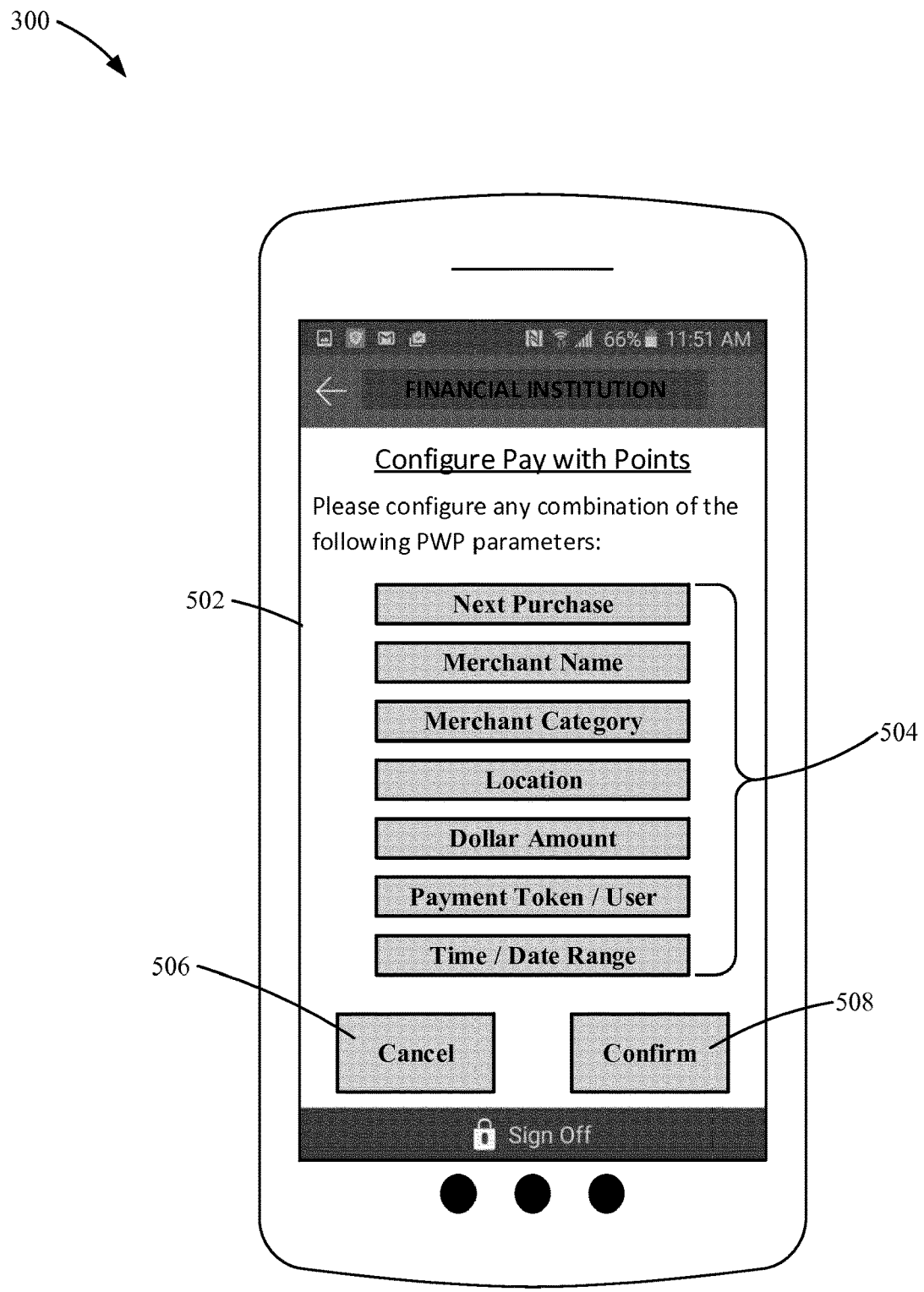

If the customer 102 selects the "Configure Pay with Points" button, 304, the user interface of the banking portal updates to display a pay with points parameters configurator 502 (as shown in FIG. 5). The pay with points parameters configurator 502 allows the customer 102 to provide the pay with points parameters to the financial institution computing system 118. The available parameters are presented to the customer 102 as a series of parameter buttons 504. When the customer 102 interacts with a given parameter button 504, the customer 102 can configure the selected pay with points parameter. The parameters may include any of next purchase, merchant name, merchant category, location, dollar amount, payment token, user, time, date range, or the like. Any combination of pay with points parameters may be configured by the customer 102 in configuring the future rewards transaction(s). Any selected parameters can be configured to expire or lapse after an expiration time. For example, during selection of the pay with points parameters, the customer 102 can designates an expiration time (e.g., 30 minutes from configuration of the pay with points parameters) for the rewards transaction or the financial institution computing system 118 can set a default expiration time (e.g., 30 minutes from configuration of the pay with points parameters). Each of the pay with points parameters are described in further detail below.

If the customer 102 interacts with the "Next Purchase" button, the customer 102 can designate the next purchase made with the payment account as being a rewards transaction. If the customer 102 interacts with "Merchant Name" button, the customer 102 can type a merchant name (e.g., Amazon®, Best Buy®, BP®, Hyatt®, etc.) to limit the rewards transaction as being associated with a particular merchant. For example, the customer 102 can select the merchant name via a drop-down list presented on the customer computing device 112 or the mobile wall wallet client 110. Similarly, the customer 102 can interact with the "Merchant Category" button to limit the rewards transaction as being associated with a particular merchant category (e.g., grocery store, gas station, hotel, movie theater, etc.). If the customer 102 interacts with the "Location" button, the customer 102 can define a location where the rewards transaction is to occur (e.g., a zip code, a city, a county, a state, a country, a geo-fence, etc.). At the time of a transaction, the location information may be received at the financial institution computing system 118 from the Merchant POS terminal 114, the mobile wallet client 11, or the customer computing device 112. The customer 102 can interact with the "Dollar Amount" button to define dollar upper or lower dollar limits for the rewards transactions (e.g., transactions under $25, transactions over $300, etc.). The customer 102 can interact with the "Payment Token/User" button to identify the specific token or user that is to receive the rewards transaction. For example, a single payment account may have multiple associated payment tokens (e.g., one token for each type of mobile wallet, such as Apple Pay, Android Pay, etc.) or multiple users (e.g., a single credit account that has credit cards issued to multiple different people). In such situations, the customer 102 can define which specific person or token is to be associated with the rewards transaction. Further, the customer 102 can interact with the "Date Range/Time" button to define a date range (including times) for the financial institution 118 to scan for rewards transactions or an expiration time in which the financial institution 118 stops scanning for rewards transactions based on the provided pay with points parameters.

Figure 6:
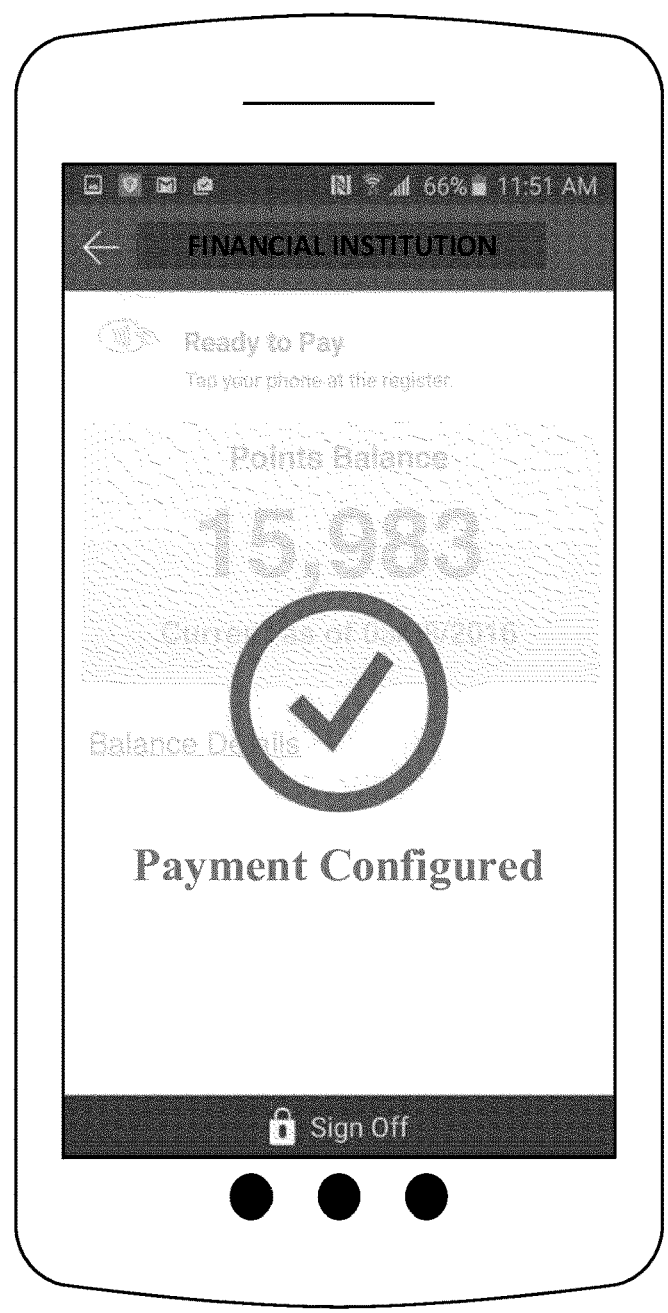
Figure 7:
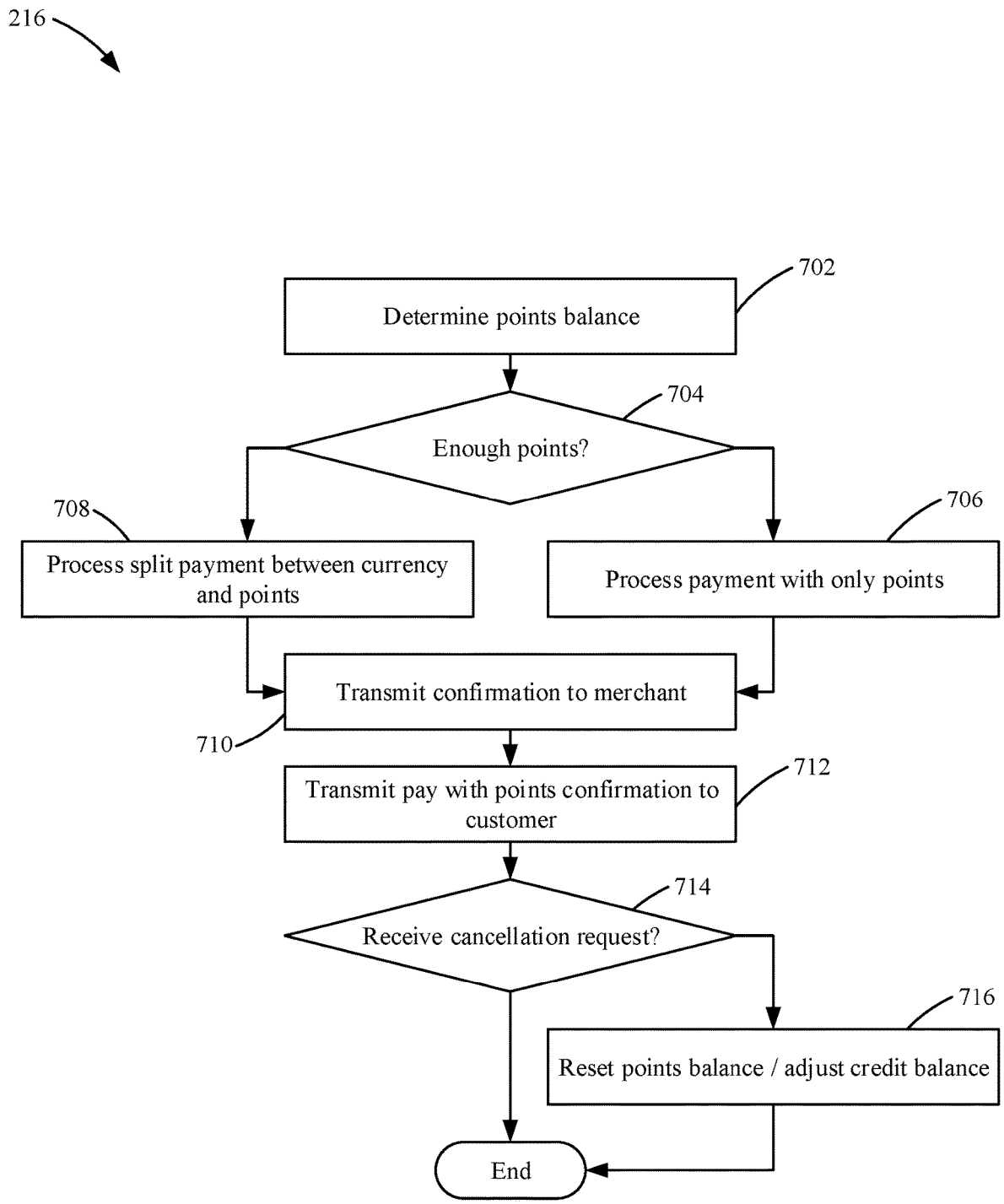
FIG. 7 is a flow diagram of a sub-process of processing the payment of the method of FIG. 2.

After selecting the desired pay with points parameters, the customer can select the cancel button 506 to cancel the pay with points request or the confirm button 502 to confirm the pay with points request. If the customer 102 selects the confirm button 502, the pay with points parameters are transmitted to the financial institution computing system 118. Upon selection of the confirm button 508, the user interface updates to display a pay with points configuration confirmation 602 (as shown in FIG. 6).

Referring again to FIG. 2, after receipt of the pay with points parameters, the financial institution computing system 118 monitors for a payment request that matches the pay with points parameters at 208. The financial institution computing system 118 compares received payment requests associated with the payment account (e.g., as received from the mobile wallet client 110, the merchant POS terminal 114, the eCommerce host 116, the payment network computing system 134, etc.) against the received pay with points parameters at 210. In some arrangements, the payment account has multiple payment devices associated with the account, such as a plastic payment card (e.g., a credit card) and at least one payment token associated with a mobile wallet. In such arrangements, unless the customer 02 designated otherwise in the payment parameters, all payment requests associated with the payment account—regardless of which device originated the payment request (e.g., the payment card 108, the mobile wallet client 110, etc.)—are monitored for matching the pay with points parameters that define the rewards transaction.

If a payment request associated with the payment account received at 210 does not match the pay with points parameters, the payment request is processed through the payment account with currency. If no payment request is received at 210, or after processing a non-rewards payment request, the financial institution computing system 118 determines if the pay with points parameters have expired at 212. The financial institution computing system 118 compares the current date and time with either the customer configured expiration time or the system default expiration time. If the pay with points parameters have expired, the pay with points parameters are terminated and the pay with points transaction matching ends at 214. If the pay with points parameters have not expired, the method returns to 208.

If a payment request associated with the payment account received at 210 matches the pay with points parameters, the payment request is processed by the financial institution computing system 118 with points at sub-process 216. Sub-process 216 is described in further detail in FIG. 7.

The customer's point balance is determined at 702. The financial institution computing system 118 cross references the accounts database 134 to determine the rewards points balance associated with the customer 102. For example, as shown in FIG. 4, the customer may have a points balance of 15,983 points. The financial institution computing system 118 determines whether there are enough points to cover the cost of the payment request at 704. Each point has a currency equivalent value. For example, each point may be worth $0.01 or a fraction thereof. The financial institution computing system 118 compares the cost of the payment request with the currency value of the customer's points.

If there are enough points to cover the cost of the payment request, the payment is processed only using points at 706. The financial institution computing system 118 debits the corresponding number of points from the customer's rewards account in the accounts database 134. If there are not enough points to cover the cost of the payment request, the payment is processed as a split payment between currency and points at 708. The financial institution computing system 118 processes a partial payment with points (up to the customer's points balance) from the rewards account and the remainder of the cost of the payment request in currency from the payment account (e.g., by using available credit if the payment account is a credit account, by debiting a checking account if the payment account is a checking account, etc.). In some arrangements, payment in currency is transmitted to the merchant 104.

A payment confirmation is transmitted to the merchant 104 at 710. The financial institution computing system 118 transmits a payment confirmation to the merchant 104 (e.g., to a merchant computing system, such as the merchant POS terminal 114 or the merchant eCommerce host 116). In some arrangements, the financial institution computing system transmits the payment confirmation to the payment network computing system 134 for routing to the merchant 104. The payment confirmation indicates that the payment request is approved. In some arrangements, the payment confirmation includes a reference number that can be used by the merchant 104 to check on the status of the transfer of funds from the financial institution 106 to the merchant 104.

Figure 8:
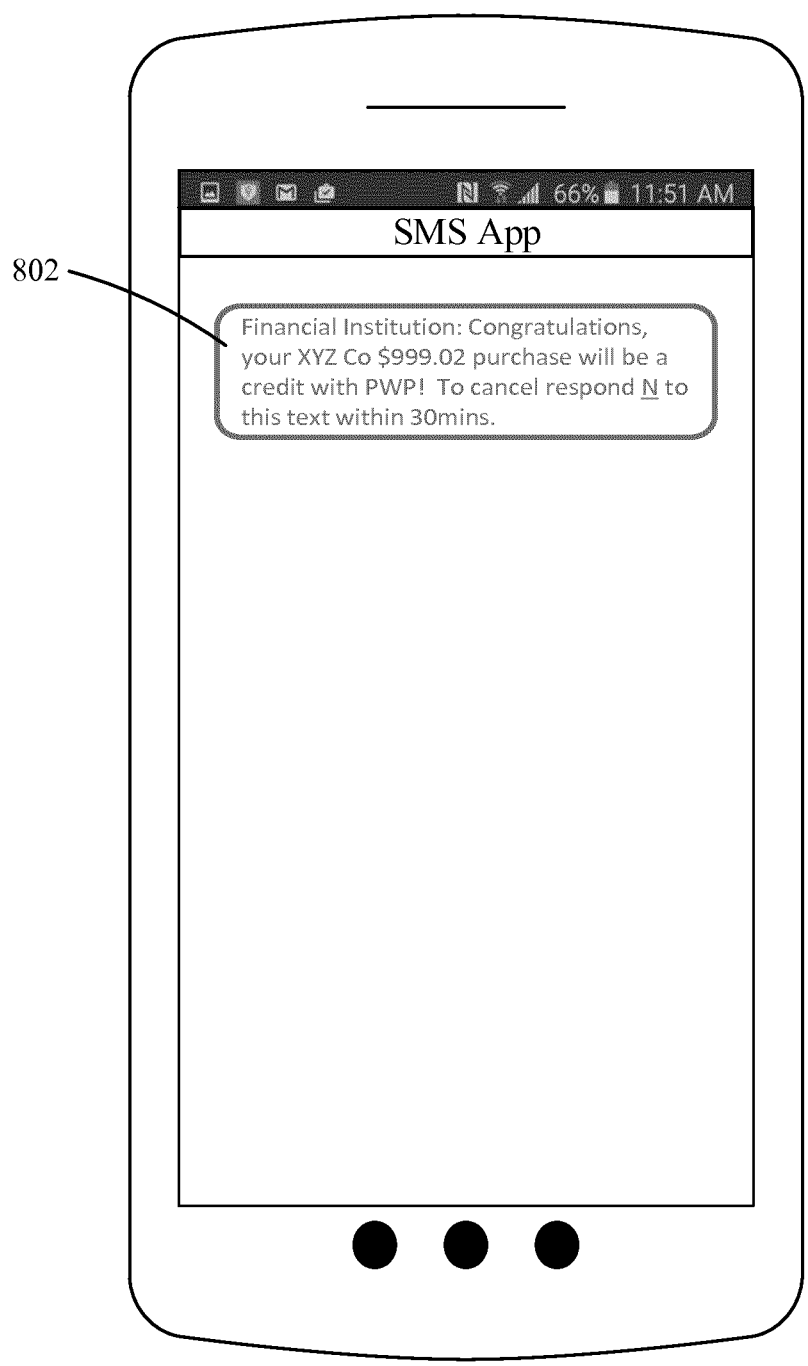
FIG. 8 is a view of a user interface showing a pay with points confirmation message transmitted during the method of FIG. 2.

A pay with points confirmation is transmitted to the customer 102 at 712. The financial institution computing system 118 formats and transmits the pay with points confirmation to the customer computing device 112 (e.g., to the customer's smartphone). The pay with points confirmation may be formatted and sent as a text message (e.g., SMS, MMS, RCS, etc.), an e-mail, or an application push notification (e.g., that is displayed in the mobile wallet client 110). An example pay with points confirmation 802 is shown in FIG. 8. The pay with points confirmation informs the customer 102 that a recent transaction associated with the payment account was processed at least partially with rewards points. The confirmation informs the customer 102 of the identity of the merchant 104 ("XYZ Co" in FIG. 8) and the amount of the purchase ("$999.02" in FIG. 8). The confirmation also provides the customer 102 to cancel the pay with points for the transaction, which causes the transaction to be processed with currency instead of points. In some arrangements, the customer 102 can cancel the pay with points for the transaction by replying to the confirmation or by clicking on a link embedded in the confirmation.

Referring again to FIG. 7, the financial institution computing system 118 determines if a cancellation request was received at 714. If a cancellation request was received from the customer 102, the customer's point balance is restored, and the payment account is debited to account for the transaction. If no cancellation request is received from the customer 102 or after the payment is adjusted at 716, the sub-process 216 ends and the method 200 continues (as described below with respect to FIG. 2).

Returning again to FIG. 2, after the payment request has been processed at 216, the method 200 proceeds down one of two paths. If the pay with points parameters are associated with a single transaction (e.g., a one-time rewards transaction), the pay with points parameters are terminated and the pay with points transaction matching ends at 214. If the pay with points parameters are not limited to a single transaction, then the method continues on to 212 as described above.

The above-described systems and methods provide efficient ways to designate a not-yet-made purchase as a rewards purchase. Accordingly, the systems and methods eliminate the need for a customer to log into their account post-transaction to designate a transaction as a rewards transaction. Further, the systems and methods allow customers to set-up multiple rewards transactions. For example, if the customer 102 is traveling and wants to pay for all expenses while on the trip, the customer 102 can configure the system 100 to identify all transactions during a designated date period and in a geographic location as being rewards transactions. Still further, the systems and methods allow the customer 102 to specifically identify payment channels associated with the payment account (e.g., plastic credit card swipe vs. mobile wallet) and users (e.g., the primary account holder vs. an authorized user) as recipients of the rewards transactions.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of performing a rewards transaction, the method comprising:
   providing, by a financial institution computing system associated with a financial institution, and to a customer device associated with a customer, a first generated graphical user interface including a selectable pay with points interaction point;
   upon selection of the selectable pay with points interaction point by the customer via the first generated graphical user interface, providing, by the financial institution computing system, and to the customer device associated with the customer, a second generated graphical user interface populated with a plurality of selectable interaction points relating to a rewards account of the customer, the rewards account of the customer maintained by the financial institution;
   receiving, by the financial institution computing system via the second generated graphical user interface, a first input from the customer selecting a selectable interaction point from the plurality of selectable interaction points, the selectable interaction point designating pay with points parameters that define the rewards transaction associated with a specific payment vehicle, the specific payment vehicle linked to a payment account maintained by the financial institution and associated with the customer, wherein the specific payment vehicle comprises a payment card or a mobile wallet, and wherein the pay with points parameters include an eligible geographical location for the rewards transaction based on a geo-fence;
   receiving, by the financial institution computing system via the second generated graphical user interface provided to the customer device, a second input from the customer selecting a date range or an expiration time to define a time period to automatically stop scanning for payment requests that match the pay with points parameters, wherein the pay with points parameters designate transactions during the time period as rewards transactions;
   receiving, by the financial institution computing system, a payment request using the specific payment vehicle and from within the eligible geographical location, the payment request including a cost in a currency, wherein the cost in the currency is more than an exchange value for an available amount of points from the rewards account of the customer;
   receiving, by the financial institution computing system, location information from the customer device;
   determining, by the financial institution computing system, that the payment request matches the rewards transaction defined by the pay with points parameters during the time period and based on the location information received from the customer device;
   debiting, by the financial institution computing system, the available amount of points from the rewards account based on the determination that the payment request matches the rewards transaction defined by the pay with points parameters during the time period and based on the location information received from the customer device;
   transmitting, by the financial institution computing system, a pay with points confirmation to the customer device, the pay with points confirmation provided via a third generated graphical user interface and including an option for the customer to cancel the rewards transaction by selecting a selectable interaction point contained in the transmitted pay with points confirmation, wherein the pay with points confirmation is transmitted as a push notification, and wherein the pay with points confirmation and the option to the customer to cancel the rewards transaction are transmitted after processing the rewards transaction and debiting the available amount of points from the rewards account, and wherein the option to cancel has a predetermined expiration period;
   receiving, by the financial institution computing system and via the third generated graphical user interface, a third user input for initiating a cancellation request from the customer device within the predetermined expiration period;
   in response to receiving the cancellation request, returning the available amount of points to the rewards account and charging the cost in the currency to the payment account; and
   comparing, by the financial institution computing system, after processing the rewards transaction, a current time with the time period to determine whether to continue scanning for a new payment request that matches the pay with points parameters.

2. The method of claim 1, wherein the available amount of points is equivalent to the cost in the currency at an exchange rate set by the financial institution.

3. The method of claim 1, further comprising charging, by the financial institution computing system, a remainder of the cost in the currency to the payment account, the remainder of the cost in the currency being equal to a difference between a currency value for the available amount of points associated with the rewards account and the cost in the currency included with the payment request.

4. The method of claim 1, wherein the pay with points parameters include an indication that the next transaction associated with the payment account is to be the rewards transaction.

5. The method of claim 1, wherein the pay with points parameters include a merchant name or a merchant category.

6. The method of claim 5, wherein the payment request includes the merchant name or the merchant category.

7. The method of claim 1, wherein the payment request is received from a point of sale system associated with a merchant.

8. The method of claim 7, further comprising:
   transmitting, by the financial institution computing system, a payment confirmation to the merchant.

9. The method of claim 1, wherein the payment account can be accessed through the payment card and the mobile wallet.

10. The method of claim 1, further comprising initiating, by the financial institution computing system, payment in the currency included in the payment request to a merchant associated with the payment request.

11. A financial institution computing system associated with a financial institution, the system comprising:
- a network interface;
- an accounts database structured to store information associated with accounts held by the financial institution, including a payment account associated with a customer and a rewards account associated with the customer;
- a processing circuit comprising a processor and memory, the processing circuit structured to:
  - provide, to a customer device associated with the customer, a first generated graphical user interface including a selectable pay with point interaction point;
  - upon selection of the selectable pay with points interaction point by the customer via the first generated graphical user interface, provide, to the customer device associated with the customer, a second generated graphical user interface populated with a plurality of selectable interaction points relating to the rewards account associated with the customer, the rewards account associated with the customer maintained by the financial institution;
  - receive, via the second generated graphical user interface, a first input from the customer selecting a selectable interaction point from the plurality of selectable interaction points, the selectable interaction point designating pay with points parameters that define a rewards transaction associated with a specific payment vehicle, the specific payment vehicle linked to the payment account associated with the customer, wherein the specific payment vehicle comprises a payment card or a mobile wallet, and wherein the pay with points parameters include an eligible geographical location for the rewards transaction based on a geo-fence;
  - receive, via the second generated graphical user interface provided to the customer device, a second input from the customer selecting a date range or an expiration time to define a time period to automatically stop scanning for payment requests that match the pay with points parameters, wherein the pay with points parameters designate transactions during the time period as rewards transactions;
  - receive a payment request using the specific payment vehicle and from within the eligible geographical location, the payment request including a cost in a currency, wherein the cost in the currency is more than an exchange value for an available amount of points from the rewards account associated with the customer;
  - receive location information from the customer device;
  - determine that the payment request matches the rewards transaction defined by the pay with points parameters during the time period and based on the location information received from the customer device;
  - debit the available amount of points from the rewards account based on the determination that the payment request matches the rewards transaction defined by the pay with points parameters during the time period and based on the location information received from the customer device;
  - transmit a pay with points confirmation to the customer device, the pay with points confirmation provided via a third generated graphical user interface and including an option for the customer to cancel the rewards transaction by selecting a selectable interaction point contained in the transmitted pay with points confirmation, wherein the pay with points confirmation is transmitted as a push notification, and wherein the pay with points confirmation and the option to the customer to cancel the rewards transaction are transmitted after processing the rewards transaction and debiting the available amount of points from the rewards account, and wherein the option to cancel has a predetermined expiration period;
  - receive, via the third generated graphical user interface, a third user input for initiating a cancellation request from the customer device within the predetermined expiration period;
  - in response to receiving the cancellation request, return the available amount of points to the rewards account and charge the cost in the currency to the payment account; and
  - compare, after processing the rewards transaction, a current time with the time period to determine whether to continue scanning for a new payment request that matches the pay with points parameters.

12. The system of claim 11, wherein the available amount of points is equivalent to the cost in the currency at an exchange rate set by the financial institution.

13. The system of claim 11, wherein the processing circuit is further structured to charge a remainder of the cost in the currency to the payment account, the remainder of the cost in the currency being equal to a difference between a currency value for the available amount of points associated with the rewards account and the cost in the currency included with the payment request.

14. The system of claim 11, wherein the pay with points parameters include an indication that the next transaction associated with the payment account is to be the rewards transaction.

15. The system of claim 11, wherein the pay with points parameters include a merchant name or a merchant category.

16. The system of claim 11, wherein the payment request is received from a point of sale system associated with a merchant.

17. The system of claim 16, wherein the processing circuit is further structured to transmit a payment confirmation to the merchant.

18. The system of claim 11, wherein the payment account can be accessed through the payment card and the mobile wallet.

* * * * *